United States Patent [19]
Ray

[11] Patent Number: 5,943,768
[45] Date of Patent: Aug. 31, 1999

[54] AUTOMOTIVE FRAMING SYSTEM

[75] Inventor: Alexander Ray, Beverly Hills, Mich.

[73] Assignee: Valiant Machine & Tool Inc., Canada

[21] Appl. No.: 08/947,296

[22] Filed: Oct. 8, 1997

[51] Int. Cl.[6] .................................................. B23P 21/00
[52] U.S. Cl. ............................... 29/822; 29/430; 29/791; 29/824; 29/771; 219/79; 219/80; 228/49.1; 198/465.1
[58] Field of Search .................................. 29/430, 897.2, 29/791, 795, 799, 822, 823, 824; 198/465.1, 465.2, 867.05; 219/79, 86.24, 158; 228/49.1, 49.6

[56] References Cited

U.S. PATENT DOCUMENTS

| | | | |
|---|---|---|---|
| 3,385,207 | 5/1968 | Opitz | 228/49.1 |
| 4,033,033 | 7/1977 | Heffner | 29/824 |
| 4,162,387 | 7/1979 | De Candia | 219/79 |
| 4,256,947 | 3/1981 | De Candia | 219/79 |
| 4,535,927 | 8/1985 | Matsubara et al. | 228/6.1 |
| 4,600,136 | 7/1986 | Sciaky et al. | 228/4.1 |
| 4,606,488 | 8/1986 | Yanagisawa | 228/45 |
| 4,670,961 | 6/1987 | Fontaine et al. | 29/429 |
| 4,738,387 | 4/1988 | Jaufmann et al. | 228/4.1 |
| 4,757,607 | 7/1988 | Sciaky et al. | 29/771 |
| 4,759,489 | 7/1988 | Pigott | 228/102 |
| 4,856,701 | 8/1989 | Pockl | 228/6.1 |
| 4,972,987 | 11/1990 | Di Rosa | 228/4.1 |
| 5,251,739 | 10/1993 | Tolocko | 198/346.2 |
| 5,313,695 | 5/1994 | Negre et al. | 29/33 P |
| 5,400,943 | 3/1995 | Rossi | 228/6.1 |
| 5,409,158 | 4/1995 | Angel | 228/182 |

FOREIGN PATENT DOCUMENTS 61-295182  12/1986  Japan ........................................ 29/791

Primary Examiner—David P. Bryant
Assistant Examiner—John Preta
Attorney, Agent, or Firm—Gifford, Krass, Groh, Sprinkle, Anderson & Citkowski, P.C.

[57] ABSTRACT

An automotive framing system for positioning a lower body component and at least two upper body components together at precise positions relative to each other prior to fixedly securing the body components together. The framing system includes a conveyor for sequentially moving body preassemblies to a predetermined assembly station. A frame of integral construction is positioned around the body at the assembly station. A lifter at the assembly station lifts the lower body component and upper body components from the conveyor together with the frame to a predetermined elevated position in which the lower body component abuts against the upper body components. With the body preassembly positioned within the assembly station, clamps on the frame engage predetermined location points on the upper and lower body components to hold the upper and lower body components together at preset positions relative to each other whereupon the body components are fixedly secured together. In the preferred embodiment, at least two frames are selectively movable in a direction both parallel and transverse to the conveyor into the assembly station to accommodate different styles of automotive body preassemblies.

13 Claims, 4 Drawing Sheets

AUTOMOTIVE FRAMING SYSTEM

BACKGROUND OF THE INVENTION

I. Field of the Invention

The present invention relates to an automotive framing system for accurately positioning upper and lower body components relative to each other prior to securing the body components together.

II. Description of the Prior Art

In the manufacture of automotive vehicles, a conveyor system typically transports a body preassembly sequentially along the conveyor line. Such body preassemblies comprise a lower body component, e.g. the lower body frame, and two or more upper body components which are supported by the lower body component. The upper and lower body components, however, are not fixedly secured to each other in the preassembly. Instead, the upper and lower body components are merely loosely fastened together.

In order to fixedly secure the upper and lower body components together, it is imperative that the upper and lower body components be precisely positioned relative to each other prior to welding or otherwise securing the body components together. In order to accomplish such precision positioning of the upper and lower body components, there have been previously known framing systems.

Two such previously known framing systems are disclosed in U.S. Pat. No. 4,670,961 to Fontaine et al. which issued on Jun. 9, 1987 and U.S. Pat. No. 4,256,947 to De Candia which issued on Mar. 17, 1981. In this prior art framing system, a gantry is positioned above an assembly station at a mid-point of the conveyor line. The gantry includes clamping arms movable between raised and a lowered position. In their raised position, the clamping arms are positioned away from the preassembly to allow the next preassembly to be moved by the conveyor system into the assembly station. Conversely, in their engaged position, the arms swing downwardly while clamps on the anus engage predetermined location points on the various body components and clamp the body components together at a preset position relative to each other. With the body components clamped together, robotic welders or the like are used to fixedly secure the body components together.

In automotive manufacturing operations, however, it is commonplace to utilize the same conveyor line to transport vehicle preassemblies of different body styles. The location points on the body components for these different styles differ from one style to the next.

In order to accommodate different types of vehicles on a common conveyor line, the previously known framing systems have utilized a turntable positioned above the work station and rotatable about a vertical axis. The turntable then indexes to provide up to four different sets of arms and clamps to selectively engage the location points on up to four different styles of automotive vehicles.

The previously known framing systems, however, suffer from a number of disadvantages. One such disadvantage is that, since the framing system is mounted wholly above the assembly station and includes an indexable turntable for bringing different clamping arms into position above the work station, the entire framing system necessarily requires a great amount of headroom at the assembly station. Such headroom, however, may not be available at the automotive manufacturing site. Furthermore, since the entire framing system is elevated above the assembly station, maintenance and maintenance access is rendered more difficult.

A still further disadvantage of these previously known framing systems is that the clamping arms are repeatedly moved between their raised and their lowered position. Such movement of the arms necessarily results in wear after prolonged activation. Such wear, together with the tolerances required to permit the movement of the arms between the raised and lowered position as well as rotation of the turntable translates into increased tolerances between the clamps on the framing system and the location points on the automotive body components. As such, such previously known framing systems have not been able to maintain precision location of the body components during the assembly process with repeatability after extended operation.

Lastly, these previously known framing systems are very costly to manufacture due in large part to the necessity of the turntable and movable arms.

SUMMARY OF THE PRESENT INVENTION

The present invention provides a framing system for automotive vehicles which overcomes all of the above-mentioned disadvantages of the previously known systems.

In brief, the automotive framing system of the present invention comprises a conveyor means for sequentially moving body preassemblies to a predetermined assembly station along the conveyor line. As before, each body preassembly comprises a lower body component, i.e. the lower body frame, and two or more upper body components which are carried by the lower body component. Typically, a skid is associated with each preassembly and the skid is positioned on the rails which form the conveyor line.

With the body preassembly positioned at the assembly station, means are provided at the assembly station for lifting the lower body component up from the skid to a predetermined elevated position in which the lower body component abuts against the upper body components. The lifting means, furthermore, includes precision locator pins which engage precise positions or openings on the lower body components so that, with the lifting means moved to its upper position, the lifting means positions the lower body component at a precise vertical and longitudinal position within the assembly station.

The framing system of the present invention further includes one, and preferably several, frames. Each frame includes a plurality of side beams which extend along both sides of the body preassembly at the assembly station as well as cross beams which extend above the vehicle at the assembly station. Unlike the previously known framing system, however, the side beams and cross beams of the frame are fixedly secured to each other thus fixing the geometry of the frame relative to the assembly station and thus relative to the preassembly.

The lifting means, when in the elevated position, also engage and lift the frame positioned in the assembly station thereby locking the geometry of the lifting means, the preassembly and the frame together.

Clamping means are mounted to each frame and movable between an engaged position and a released position. In their engaged position, the clamping means engage preset location points on the body components to hold the body components at preset positions relative to each other. With the clamping means engaged, means, such as robotic welders, are used to fixedly secure the body components together.

Conversely, in their released position, the clamping means disengage from the now-assembled body components to permit the now-assembled body components to be moved by the conveyor away from the assembly station and simultaneously move the next body preassembly into the assembly station.

Two or more frames are movably mounted relative to the conveyor system adjacent one end of the assembly station in a direction transverse to the conveyor system as well as in a direction parallel to the direction of travel of the conveyor system. Optionally one or two frames are similarly movably mounted adjacent the opposite end of the assembly station. Each frame includes clamping means adapted for different types of automotive vehicles having differently positioned points on the body components. An indexing mechanism, such as a ball and screw, hydraulic actuator or the like is then actuated to selectively move the appropriate frame with its clamping means into the assembly station in dependence upon the type of vehicle of the body preassembly positioned within the assembly station.

In order to provide power, such electrical, pneumatic and hydraulic power to the clamping means on the various frames, a cat track is provided for each frame and extends between the frame and a supporting floor. The cat track defines a flexible interior channel through which the various power and control connections extend.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
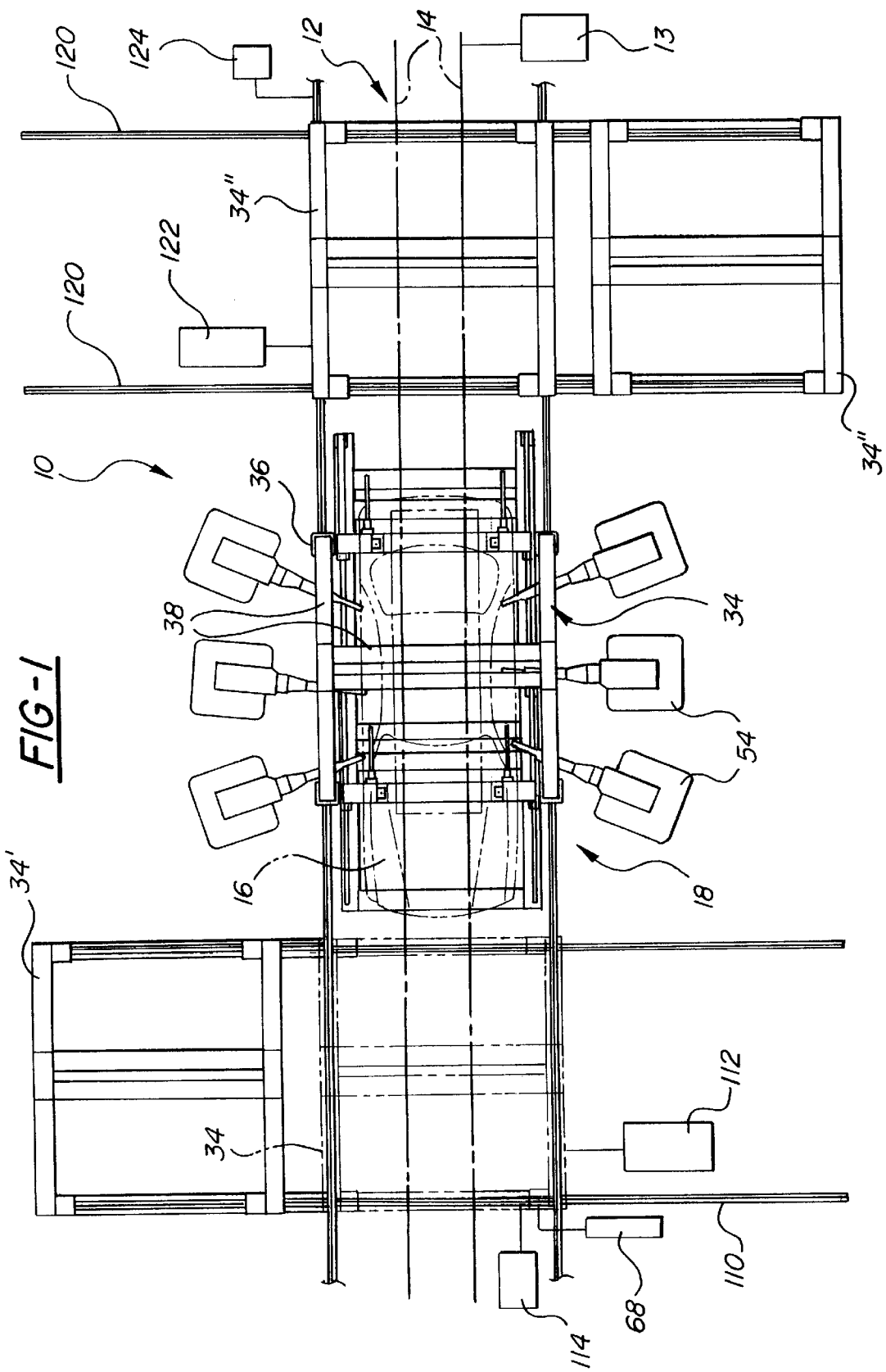
FIG. 1 is a top plan view illustrating a preferred embodiment of the present invention and with parts removed for clarity.
Figure 2:
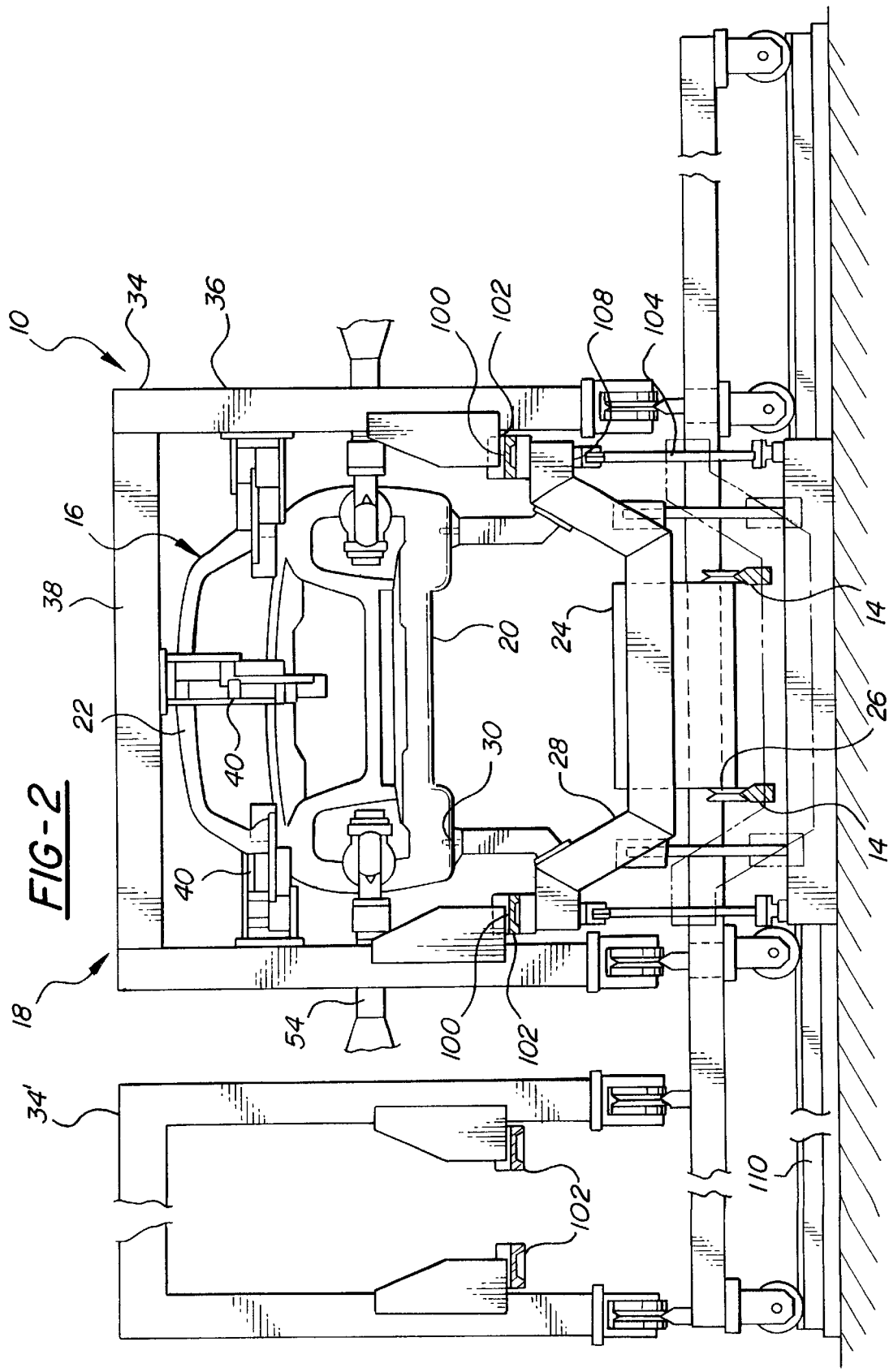
FIG. 2 is a front view illustrating the preferred embodiment of the invention.

With reference first to FIGS. 1 and 2, a preferred embodiment of the framing system 10 of the present invention is thereshown for use with a manufacturing line for automotive vehicles. An elongated conveyor 12, preferably comprising a pair of spaced apart rails 14, sequentially conveys automotive body preassemblies 16 (only one shown) to a assembly station 18 at a mid-point on the conveyor 12. Any conventional drive means 13 (illustrated only diagrammatically) is used to power the conveyor 12. Each body preassembly 16, furthermore, includes a lower body component 20 (FIG. 2), i.e. the lower frame, and two or more upper body components 22 which are unattached to each other except by restraining tags.

As best shown in FIG. 2, a skid 24 is movably mounted to the rails 14 by rollers 26. One skid 24 is associated with each body preassembly 16 and the skid 24 supports the lower body component 20. The upper body components 22 in turn sit on top of the lower body component 20.

As best shown in FIG. 2, with the body preassembly 16 positioned at the assembly station 18, a lifting means 28 is actuated and moves under the body preassembly 16 from a lower position, illustrated in phantom line in FIG. 2, to a raised position, illustrated in solid line. With the lifting assembly 28 in its lower position, the lower body component 20 is supported by the skid 24. Conversely, as the lifting assembly 28 is moved to its upper position, locating pins 30 on the lifting assembly 28 engage locating holes in the lower body component 20. Furthermore, with the lifting assembly 28 in its uppermost position, the lower body component 20 is precisely positioned both vertically and longitudinally within the assembly station 18 and is also in abutment with the upper body components 22.

With reference again to FIGS. 1 and 2, in order to precisely position the upper body components 22 relative not only to each other but also to the lower body component 20, a rigid frame 34 is positioned around the body preassembly 16 at the assembly station 18. Although the construction of the frame 34 may vary, in the preferred body of the invention, the frame 34 includes a pair of longitudinally spaced side beams 36 on each side of the preassembly 16. A plurality of upper longitudinally and laterally extending cross beams 38 interconnect the side beams 36 together so that the side beams 36 and upper cross and lateral beams 38 are of an integral construction. Consequently, once the frame 34 is constructed, the geometry of the frame 34 is fixed.

Figure 4:
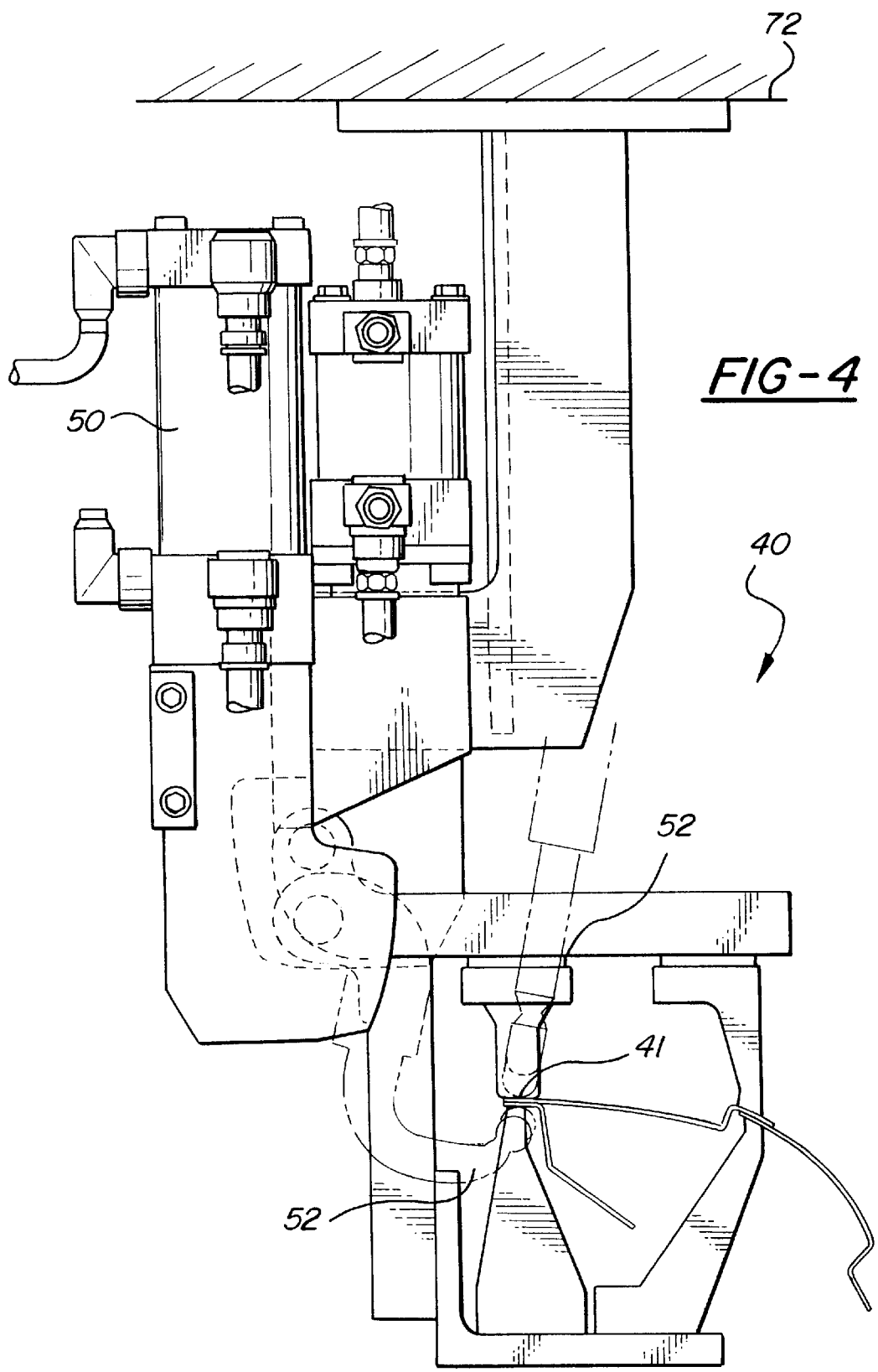
FIG. 4 is a view illustrating an exemplary clamping assembly of the present invention.

With reference now to FIGS. 2 and 4, at least one and preferably several clamping means 40 are carried by the frame 34. The precise clamping means 40 will vary depending upon the particular size and style of the body preassembly 16. However, an exemplary clamping means 40 is shown in FIG. 4 and includes an actuator 50 which selectively moves pinching fingers 52 between an open position, illustrated in phantom line and a closed position, illustrated in solid line. In its engaged position, the clamping means 40 engages predetermined location areas 41 on the body components 20 and/or 22 and thus maintains these body components at a fixed and predetermined position relative not only to the frame 34, but relative to each other. Consequently, with the clamping means 40 in the engaged position and the body components 20 and 22 properly positioned with respect to each other, conventional means, such as robotic welders 54 (FIGS. 1 and 2) are then used to fixedly secure the body components 20 and/or 22 together.

Figure 3:
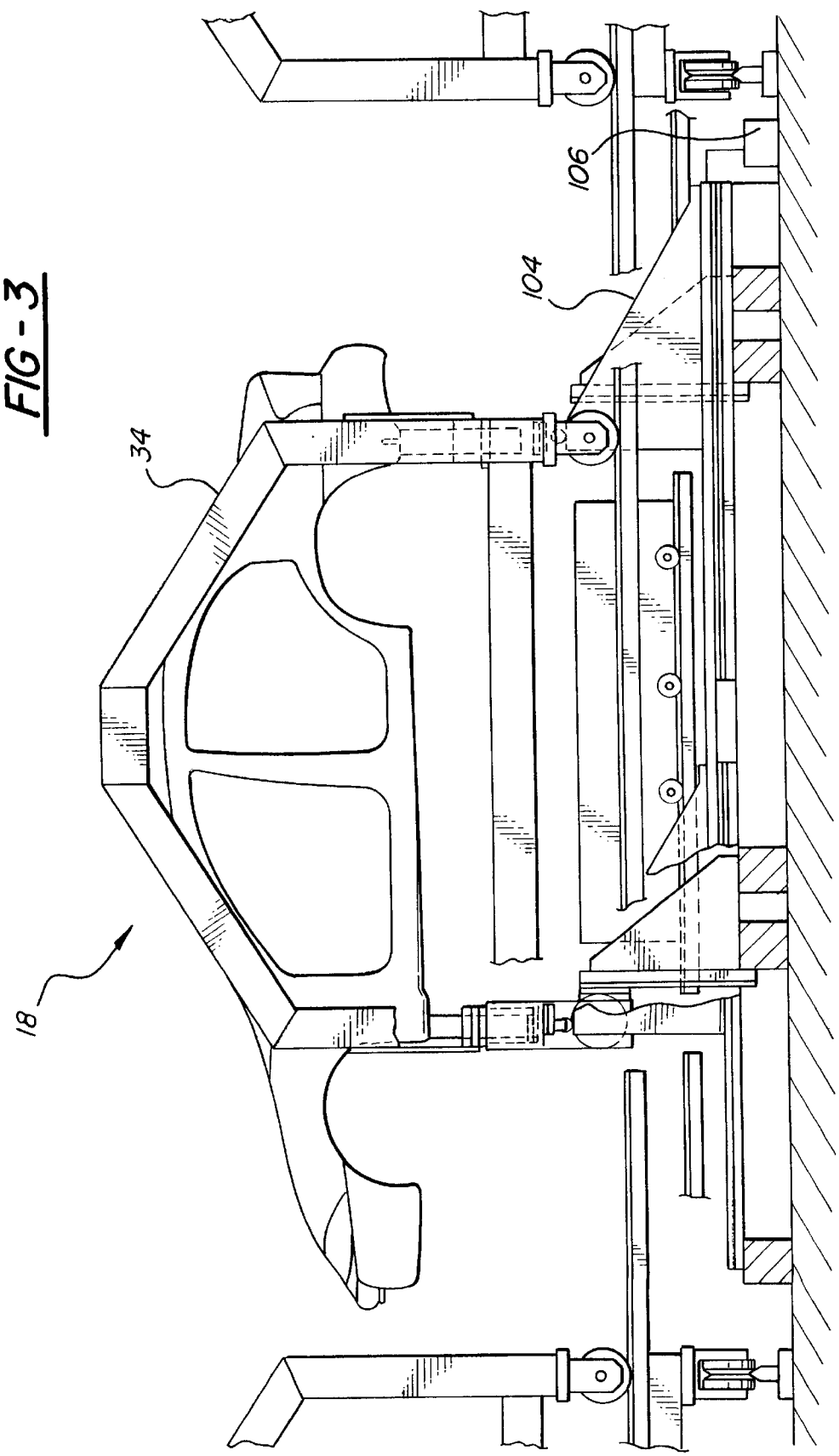
FIG. 3 is a side view illustrating the preferred embodiment of the present invention.

With reference now to particularly to FIGS. 2 and 3, as the lifting assembly 28 is moved from its lower position to its upper position, immediately adjacent its upper position, an abutment surface 100 on the lifting assembly 28 engages abutment surfaces 102 on the frame 34. Thus, when the lifting assembly 28 is moved to its fully raised position, the abutment between the surfaces 102 and 108 causes the lifting assembly 28 to lift the frame 34 by a small distance, e.g. 1/16 inch. In doing so, the vertical geometry of the lifting assembly 28 is fixed with respect to the geometry of the frame 34.

As best shown in FIG. 2, any conventional means can be used to move the lifting assembly 28 from its lower position and to its upper position. However, in one embodiment, inclined actuating surfaces 104 are positioned on opposite sides of the assembly station 18 and are longitudinally displaceable in a direction generally parallel to the direction of the conveyor 14. These ramp actuators 104 are longitudinally displaced by any conventional means 106 (illustrated only diagrammatically) and engage in abutment surface 108 on the bottom of the lifting assembly 28. Any other conventional means, however, may alternatively be used to move the lifting assembly 28 between its elevated and its lowered position.

Following the welding of the body components 20 and 22, the clamping means 40 are moved to their released position thereby disengaging from the now-assembled body components 20 and 22. The lifting assembly 28 (FIG. 2) is then moved to its lowered position by the actuation 106 (FIG. 3) thus placing the now-assembled body components on the skid 24 and the robotic welders 54 are retracted away from the frame 34. The conveyor 12 then moves the now-assembled body components out of the assembly station 18 and simultaneously moves the next sequential preassembly 16 into the assembly station 18 whereupon the above-identified process is repeated.

It can, therefore, be seem that a primary advantage of applicant's invention is that, since the frame 34 is of an integral construction with the side beams and upper cross beams fixedly secured to each other, the geometry of the frame 34, and thus the position of the clamping means 40, are fixed. Likewise, the geometry of the lifting assembly 28, and thus the position of the body components 20 and 22, are fixed relative to the frame 34 by the abutment surfaces 100 and 102. This, in turn, enables high precision repeatability of positioning the body components at the assembly station 18 as desired.

In many, if not most, manufacturing lines of automotive vehicles, it is desirable to have two or even more different types of vehicles on a common conveyor line. Such different vehicles typically have different upper and lower body components which require different clamping means 40 to engage different location points on the body components in order to properly position them relative to each other.

With reference now particularly to FIGS. 1 and 2, in the preferred embodiment of the present invention, a pair of frames 34 and 34' are positioned adjacent one end of the work station 18. These frames 34 are movable in a direction transverse to the direction of travel of the conveyor 12 along rails 110 by any conventional power means 112 (illustrated only diagrammatically) so that one of the frames 34 or 34' is aligned with the conveyor system 12. Second power of means 114 (illustrated only diagrammatically) are then used to longitudinally displace the frame 34' between the rails 110 and the assembly station 18. Appropriate stops (not shown) may be provided between the frame 34 or 34' and the conveyor 14 within the assembly station 18 in order to ensure precise positioning of the frame 34 or 34' within the assembly station 18.

Consequently, in operation, the frames 34 and 34' are transversely displaced with respect to the conveyor line 12 until the appropriate frame 34 or 34' matching the preassembly at the assembly station 18 is positioned in line with the conveyor 18 by the power means 112. The power means 114 is then actuated to move the selected frame 34 or 34' into the assembly station 18 as required.

Referring now particularly to FIG. 1, in the event that three or four different frames are required for the assembly line, a pair of frames 34" can likewise be movably positioned on rails 120 adjacent the opposite end of the assembly station 18. These frames 34" are similarly laterally displaced by power means 122 and longitudinally displaced by power means 124, both of which are illustrated only diagrammatically, in order to position the selected frame 34 in the assembly station 118 as required.

It will, of course, be appreciated that each of the different frames 34, 34" and 34" all contain clamping means 40 to accommodate a particular preassembly 16 of one automotive style. Such clamping means are custom designed for each frame 34–34" in dependence upon the requirement of the locating areas of the body components 20 and 22 for that particularly automotive style.

A primary advantage of applicant's invention resides in the modularity of the framing system 10. More specifically, if only one or two different body styles are required, it is necessary only to provide one or two frames 34 and 34' adjacent one end of the assembly station 18. Conversely, when a third or fourth frame is necessary to accommodate a third and/or fourth body style, additional frames 34", together with their associated rails 120 and power means 122 and 124 can be added at a later date to the overall system.

Although the invention has been described as showing a maximum of four frames 34–34", it will be appreciated that, if required, additional frames can also be accommodated by merely providing three or even more frames transversely movable adjacent each end of the assembly station 18. The only practical limitations on the number of frames resides in the cycle time necessary to properly position the required frame in the assembly station 18 in order to perform the assembly operation.

With reference again to FIG. 1, it is necessary to provide power, such as electrical power, pneumatic power and/or hydraulic power to the clamping means 40 contained on each of the frames 34. In the preferred embodiment, a cat track 68 (only one shown) is associated with each frame 34 to accommodate transverse movement and a second cat track 69 to accommodate longitudinal movement. Each cat track 68 and 69, in the well known fashion, defines a flexible interior channel through which the various power connections extend.

From the foregoing, it can be seen that the present invention achieves several advantages over the previously known framing systems. Perhaps most importantly, the framing system of the present invention, because of its integral construction of the frame 34, maintains a precise geometry which is not subject to machine tolerances, wear and tear and the like.

A still further advantage of the present invention is that, unlike previously known systems, only relatively modest ceiling space is required in order to accommodate the framing system of the present invention. This in turn results in lower maintenance cost and lower maintenance access cost.

A still further advantage of the present invention is that the framing system of the present invention is relatively low in cost when compared to the previously known overhead gantry systems. This relatively low cost is achieved in part by the low cost integral construction of the frames 34 as well as the longitudinal indexing of the frames 34 as opposed to the previously known overhead turntable designs.

A still further advantage resides in the modularity of the invention which enables additional frames to be added only when and if required.

Having described my invention, however, many modifications thereto will become apparent to those skilled in the art to which it pertains without deviation from the spirit of the invention as defined by the scope of the appended claims.

I claim:

1. An automotive framing system for positioning a lower body component and at least two upper body components together, said upper body components being positioned on top of said lower body component to form a body preassembly, said framing system comprising:

conveyor means for sequentially moving body preassemblies to a predetermined assembly station, means at said assembly station for lifting said lower body component and said upper body components from said conveyor means to a predetermined elevated position in which said lower body component abuts against said upper body components, at least two frames, each said frame being of integral construction, means for selectively positioning one of said frame at said assembly station, each said frame having structural beams extending over and around both sides of a preassembly positioned at said assembly station, said structural beams being permanently secured together, clamping means mounted to each said frame and selectively movable between an engaged position and a released position, wherein in said engaged position, said clamping means engage predetermined location points on said upper and/or lower body components of said preassembly and hold said upper and/or lower body components of said preassembly together at preset positions relative to each other, wherein in said released position, said clamping means disengage from said preassembly to enable removal of said preassembly from said assembly station, and wherein said selective positioning means comprises first moving means longitudinally adjacent said assembly station for moving each said frame in a direction transverse to said conveyor means to a position adjacent to and longitudinally aligned with said assembly station and second moving means for selectively moving each said frame between said position adjacent to and longitudinally aligned with said assembly station and said assembly station.

2. The invention as defined in claim 1 and comprising at least three said frames.

3. The invention as defined in claim 1 wherein said conveyor means sequentially moves said preassemblies along a predetermined path of travel, said assembly station being positioned at a mid point of said conveyor means.

4. The invention as defined in claim 1 wherein said framing system is supported by a floor, and further comprising means extending between said floor and each of said frames for supplying power to said clamping means.

5. The invention as defined in claim 4 wherein said supplying means comprises a cat track associated with each frame, said cat track defining an interior channel through which power connections extend.

6. The invention as defined in claim 1 wherein said conveyor means comprises a pair of elongated rails, a skid associated with each preassembly, said skid supporting its associated preassembly, and means for longitudinally movably mounting said skid to said rails.

7. The invention as defined in claim 1 and comprising means at said assembly station for fixedly securing said body components together when said clamping means is in said engaged position.

8. The invention as defined in claim 7 wherein said fixedly securing means comprises at least one welder.

9. The invention as defined in claim 8 wherein said welder is a robotic welder.

10. The invention as defined in claim 1 wherein said frame comprises a pair of side beams extending along each side of one preassembly positioned in said assembly station, and at least one upper cross beam positioned above one preassembly positioned in said assembly station, said side beams and said upper cross beam being fixedly secured together.

11. The invention as defined in claim 1 wherein said lifting means comprises abutment means for engaging and lifting said frame when said lifting means is in said elevated position.

12. The invention as defined in claim 11 wherein said abutment means comprises a first abutment plate on said lifting means which engages a second abutment plate on said frame at a position closely adjacent said elevated position of said lifting means.

13. The invention as defined in claim 1 and comprising at least three frames, at least two of said frames being transversely movable relative to said conveyor means adjacent one end of said assembly station, and at least one of said frames being transversely movable relative to said conveyor means adjacent the other end of said assembly station.

* * * * *